(12) United States Patent
Ramchandran

(10) Patent No.: US 7,340,562 B2
(45) Date of Patent: Mar. 4, 2008

(54) CACHE FOR INSTRUCTION SET ARCHITECTURE

(75) Inventor: Amit Ramchandran, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 115 days.

(21) Appl. No.: 10/628,036

(22) Filed: Jul. 24, 2003

(65) Prior Publication Data

US 2004/0093465 A1 May 13, 2004

Related U.S. Application Data

(60) Provisional application No. 60/422,063, filed on Oct. 28, 2002.

(51) Int. Cl.
*G06F 12/00* (2006.01)

(52) U.S. Cl. ............... 711/108; 711/3; 711/119; 711/131; 711/218

(58) Field of Classification Search .......... 711/131
See application file for complete search history.

(56) References Cited

U.S. PATENT DOCUMENTS

| | | | | |
|---|---|---|---|---|
| 5,287,480 A | * | 2/1994 | Wahr | 711/131 |
| 5,557,734 A | * | 9/1996 | Wilson | 345/505 |
| 5,875,355 A | * | 2/1999 | Sidwell et al. | 712/300 |
| 6,446,181 B1 | * | 9/2002 | Ramagopal et al. | 711/168 |
| 6,513,125 B1 | * | 1/2003 | Garde | 713/500 |
| 6,535,452 B2 | * | 3/2003 | Okuda et al. | 365/230.03 |
| 6,557,078 B1 | * | 4/2003 | Mulla et al. | 711/122 |
| 6,604,174 B1 | * | 8/2003 | Dean et al. | 711/131 |
| 6,725,344 B2 | * | 4/2004 | Pawlowski | 711/146 |
| 6,745,293 B2 | * | 6/2004 | Lasserre et al. | 711/131 |
| 6,795,078 B2 | * | 9/2004 | Lavelle et al. | 345/535 |
| 6,912,638 B2 | * | 6/2005 | Hellman et al. | 711/167 |
| 6,924,812 B2 | * | 8/2005 | Koneru et al. | 345/552 |

OTHER PUBLICATIONS

Computer Organization and Design 2nd Edition, Hennessy, 1998, Morgan Kaufmann Publishers, pp. 569-570.*

* cited by examiner

*Primary Examiner*—Reginald Bragdon
*Assistant Examiner*—Horace L. Flournoy
(74) *Attorney, Agent, or Firm*—Patterson & Sheridan, L.L.P.

(57) ABSTRACT

A distributed data cache includes a number of cache memory units or register files each having a number of cache lines. Data buses are connected with the cache memory units. Each data bus is connected with a different cache line from each cache memory unit. A number of data address generators are connected with a memory unit and the data buses. The data address generators retrieve data values from the memory unit and communicate the data values to the data buses without latency. The data address generators are adapted to simultaneously communicate each of the data values to a different data bus without latency. The cache memory units are adapted to simultaneously load data values from the data buses, with each data value loaded into a different cache line without latency.

17 Claims, 8 Drawing Sheets

| 0 | 807 | Control Word 0 |
| 1 | 809 | Control Word 1 |
| 2 | 811 | Control Word 2 |
| 3 | 813 | Control Word 3 |
| 4 | 815 | Control Word 4 |
| 5 | 817 | Control Word 5 |
| 6 | 819 | Control Word 6 |
| 7 | 821 | Control Word 7 |
805
FIG. 8A
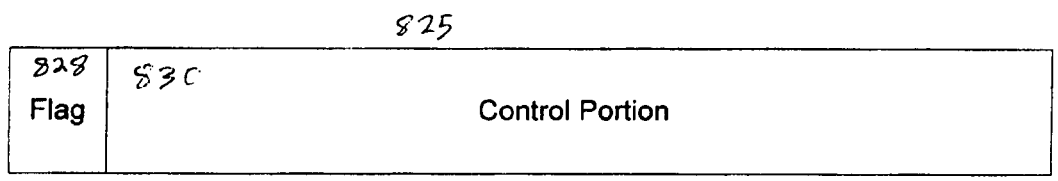
FIG. 8B
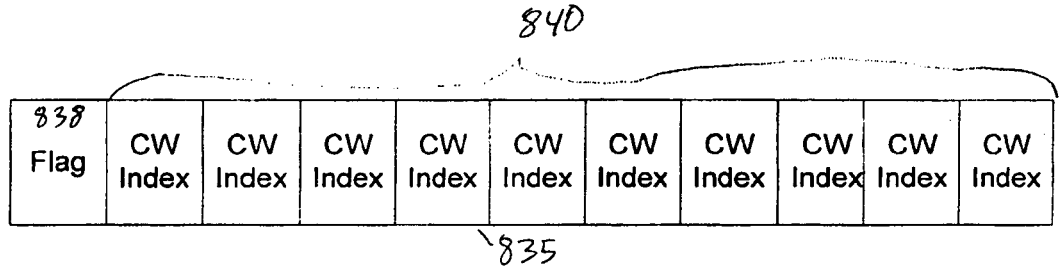
FIG. 8C

CACHE FOR INSTRUCTION SET ARCHITECTURE

CROSS-REFERENCES TO RELATED APPLICATIONS

This application claims priority from U.S. Provisional Patent Application Ser. No. 60/422,063, filed Oct. 28, 2002; entitled "RECONFIGURATION NODE RXN" which is hereby incorporated by reference as if set forth in full in this application.

"ADAPTABLE DATAPATH FOR A DIGITAL PROCESSING SYSTEM," Ser. No. 10/626,833, filed Jul. 23, 2003;

"INPUT PIPELINE REGISTERS FOR A NODE IN AN ADAPTIVE COMPUTING ENGINE," Ser. No. 10/626,479, filed Jul. 23, 2003.

BACKGROUND OF THE INVENTION

This invention is related in general to digital processing architectures and more specifically to the design of a reconfigurable processing node for use in an adaptive computing engine.

The advances made in the design and development of integrated circuits ("ICs") have generally produced information processing devices falling into one of several distinct types or categories having different properties and functions, such as microprocessors and digital signal processors ("DSPs"), application specific integrated circuits ("ASICs"), and field programmable gate arrays ("FPGAs"). Each of these different types or categories of information processing devices have distinct advantages and disadvantages. Microprocessors and DSPs, for example, typically provide a flexible, software programmable solution for a wide variety of tasks. The flexibility of these devices requires a large amount of instruction decoding and processing, resulting in a comparatively small amount of processing resources devoted to actual algorithmic operations. Consequently, microprocessors and DSPs require significant processing resources, in the form of clock speed or silicon area, and consume significantly more power compared with other types of devices.

ASICs, while having comparative advantages in power consumption and size, use a fixed, "hard-wired" implementation of transistors to implement one or a small group of highly specific tasks. ASICs typically perform these tasks quite effectively; however, ASICs are not readily changeable, essentially requiring new masks and fabrication to realize any modifications to the intended tasks.

FPGAs allow a degree of post-fabrication modification, enabling some design and programming flexibility. FPGAs are comprised of small, repeating arrays of identical logic devices surrounded by several levels of programmable interconnects. Functions are implemented by configuring the interconnects to connect the logic devices in particular sequences and arrangements. Although FPGAs can be reconfigured after fabrication, the reconfiguring process is comparatively slow and is unsuitable for most real-time, immediate applications. Additionally, FPGAs are very expensive and very inefficient for implementation of particular functions. An algorithmic operation implemented on an FPGA may require orders of magnitude more silicon area, processing time, and power than its ASIC counterpart, particularly when the algorithm is a poor fit to the FPGA's array of homogeneous logic devices.

Matrix operations are used in a wide variety of applications. Image and video applications, audio applications, and signal processing applications can all use matrix operations to perform frequency domain transforms, such as discrete cosine and fast Fourier transforms. Image processing applications can use matrix operations to perform down sampling, color conversion, and quantization. Video applications can use matrix operations to perform video compression or decompression, for example MPEG4. Signal processing applications can use matrix applications to implement finite impulse response (FIR) filters. Matrix operations also are used to interpolate data, correlate sets of data, and perform complex-valued mathematical operations.

Most matrix operations must be performed in real-time, so processing speed is an important design consideration. In addition, with some applications, for example mobile communication devices, limited battery capacity makes power consumption a consideration. Cost is also a consideration, thus, the efficient use of silicon area is a priority for many applications.

Thus, it is desirable to provide a node for use in an adaptive computing engine specifically adapted to performing matrix operations. It is further desirable that this node provide fast performance, flexible configuration, low power consumption, and low cost for a wide variety of applications.

BRIEF SUMMARY OF THE INVENTION

One aspect of the present invention includes a distributed data cache including a first cache memory unit having a number of cache lines and a number of data buses connected with the cache memory unit. Each one of the data buses is connected with a different cache line in the cache memory unit. In an additional embodiment, the number of cache lines of the first cache unit is less than or equal to the number of data buses.

In an embodiment, a data path for processing data is connected with the data buses. The data path has at least one data input and at least one data output. The input and output are connected with the data buses. In a further embodiment, a multiplexer alternately connects each data bus with the input or output.

In another embodiment, the distributed data cache includes a number of data address generators connected with a memory unit and the data buses. The data address generators are adapted to retrieve a number of data values from the memory unit and communicate the data values to the data buses. In a further embodiment, the data address generators are adapted to simultaneously communicate the data values to the data buses, wherein each of the data values is communicated to a different data bus. In yet another embodiment, the first cache memory unit is adapted to simultaneously load data values from the data buses. Each data value is loaded into a different cache line of the first cache memory unit.

In an additional embodiment, the distributed data cache of the present invention includes at least one additional cache memory unit. Each additional cache memory unit also has a number of cache lines, and each cache line of each additional cache memory units is connected with a different data buses. In a further embodiment, the total number of cache memory units is equal to the number of cache lines in each cache memory unit.

Another aspect of the present invention is an apparatus for transposing a plurality of data values arranged in a matrix. The apparatus includes a number of cache memory units.

Each cache memory unit has a number of cache lines. A number of data buses are connected to the cache memory units. Each data bus is connected with a different cache line from each of the cache memory units.

In an embodiment, the apparatus also includes a number of data address generators adapted to retrieve data values from a memory unit and to communicate the data values to the data buses. In a further embodiment, the data values can be divided into a number of separate sets. In an embodiment, each set of data values corresponds to a matrix row. Alternatively, each set of data values corresponds to a matrix column. The data address generators are adapted to sequentially communicate the sets of data values with the plurality of data buses. In an additional embodiment, the data values in each set are communicated simultaneously with the data buses, with each data value communicated to a different data bus.

Yet another aspect of the present invention is a method for transposing data values arranged in a matrix. The method includes retrieving a first subset of data values from a memory unit, and simultaneously transferring the first subset of data values to a number of data buses, and simultaneously loading the first subset of data values from the data buses to a first cache memory unit having a plurality of cache lines. Each data value of the first subset is transferred to a different one of the plurality of data buses, and each cache line receives a data value from a different one of the plurality of data buses. Alternatively, the first subset of data values is a matrix column. In an additional embodiment, the steps of retrieving, transferring, and loading are repeated to load a second subset of data values into a second cache memory unit via the data buses. In a further embodiment, the first subset of data values is a matrix row.

BRIEF DESCRIPTION OF THE DRAWINGS

The present invention will be discussed with reference to the drawings, in which:

FIG. 8A illustrates a control word cache according to an embodiment of the invention;

FIG. 8B illustrates a format of a control word according to an embodiment of the invention; and FIG. 8C illustrates a compressed control word according to an embodiment of the invention.

DETAILED DESCRIPTION OF THE INVENTION

To address the deficiencies of prior types of information processing devices, an adaptive computing engine (ACE) architecture has been developed that provides the programming flexibility of a microprocessor, the speed and efficiency of an ASIC, and the post-fabrication reconfiguration of an FPGA. The details of this architecture are disclosed in the U.S. patent application Ser. No. 09/815,122, entitled "Adaptive Integrated Circuitry with Heterogeneous and Reconfigurable Matrices of Diverse and Adaptive Computational Units having Fixed, Application Specific Computational Elements," filed on Mar. 22, 2001, and incorporated by reference herein.

Figure 1:
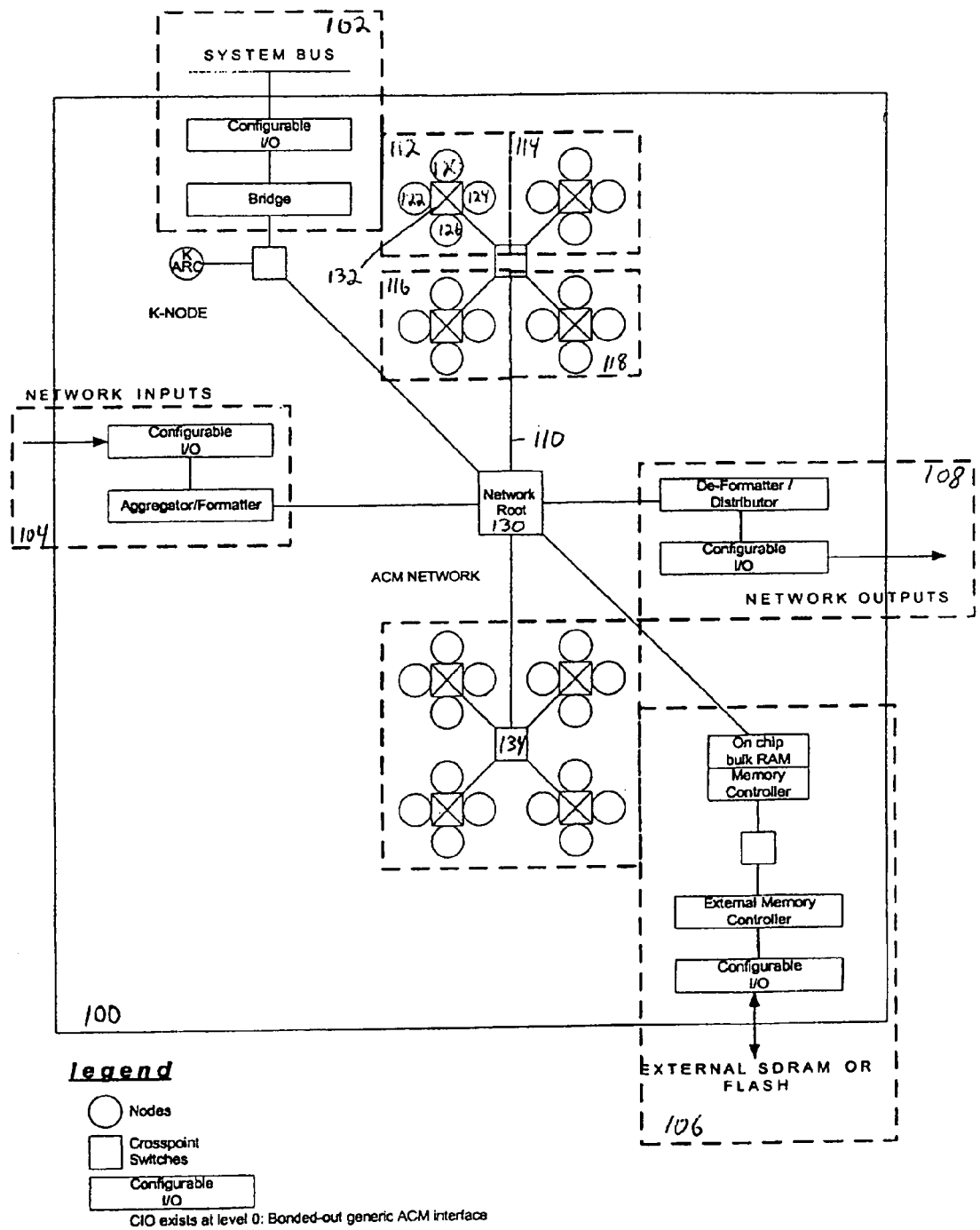
FIG. 1 illustrates an adaptive computing device according to an embodiment of the invention.

In general, the ACE architecture includes a plurality of heterogeneous computational elements coupled together via a programmable interconnection network. FIG. 1 illustrates an embodiment 100 of an ACE device. In this embodiment, the ACE device is realized on a single integrated circuit. A system bus interface 102 is provided for communication with external systems via an external system bus. A network input interface 104 is provided to send and receive real-time data. An external memory interface 106 is provided to enable this use of additional external memory devices, including SDRAM or flash memory devices. A network output interface 108 is provided for optionally communicating with additional ACE devices, as discussed below with respect to FIG. 2.

A plurality of heterogeneous computational elements (or nodes), including computing elements 120, 122, 124, and 126, comprise fixed and differing architectures corresponding to different algorithmic functions. Each node is specifically adapted to implement one of many different categories or types of functions, such as internal memory, logic and bit-level functions, arithmetic functions, control functions, and input and output functions. The quantity of nodes of differing types in an ACE device can vary according to the application requirements.

Because each node has a fixed architecture specifically adapted to its intended function, nodes approach the algorithmic efficiency of ASIC devices. For example, a binary logical node may be especially suited for bit-manipulation operations such as, logical AND, OR, NOR, XOR operations, bit shifting, etc. An arithmetic node may be especially well suited for math operations such as addition, subtraction, multiplication, division, etc. Other types of nodes are possible that can be designed for optimal processing of specific types.

Programmable interconnection network 110 enables communication among a plurality of nodes, and interfaces 102, 104, 106, and 108. By changing the number and order of connections between various nodes, the programmable interconnection network is able to quickly reconfigure the ACE device for a variety of different tasks. For example, merely changing the configuration of the interconnections between nodes allows the same set of heterogeneous nodes to implement vastly different functions, such as linear or non-linear algorithmic operations, finite state machine operations, memory operations, bit-level manipulations, fast Fourier or discrete cosine transformations, and many other high level processing functions for advanced computing, signal processing, and communications applications.

In an embodiment, programmable interconnection network 110 comprises a network root 130 and a plurality of crosspoint switches, including switches 132 and 134. In an embodiment, programmable interconnection network 110 is logically and/or physically arranged as a hierarchical tree to maximize distribution efficiency. In this embodiment, a number of nodes can be clustered together around a single crosspoint switch. The crosspoint switch is further connected with additional crosspoint switches, which facilitate communication between nodes in different clusters. For example, cluster 112, which comprises nodes 120, 122, 124, and 126, is connected with crosspoint switch 132 to enable communication with the nodes of clusters 114, 116, and 118. Crosspoint switch is further connected with additional crosspoint switches, for example crosspoint switch 134 via network root 130, to enable communication between any of the plurality of nodes in ACE device 100.

Figure 2:
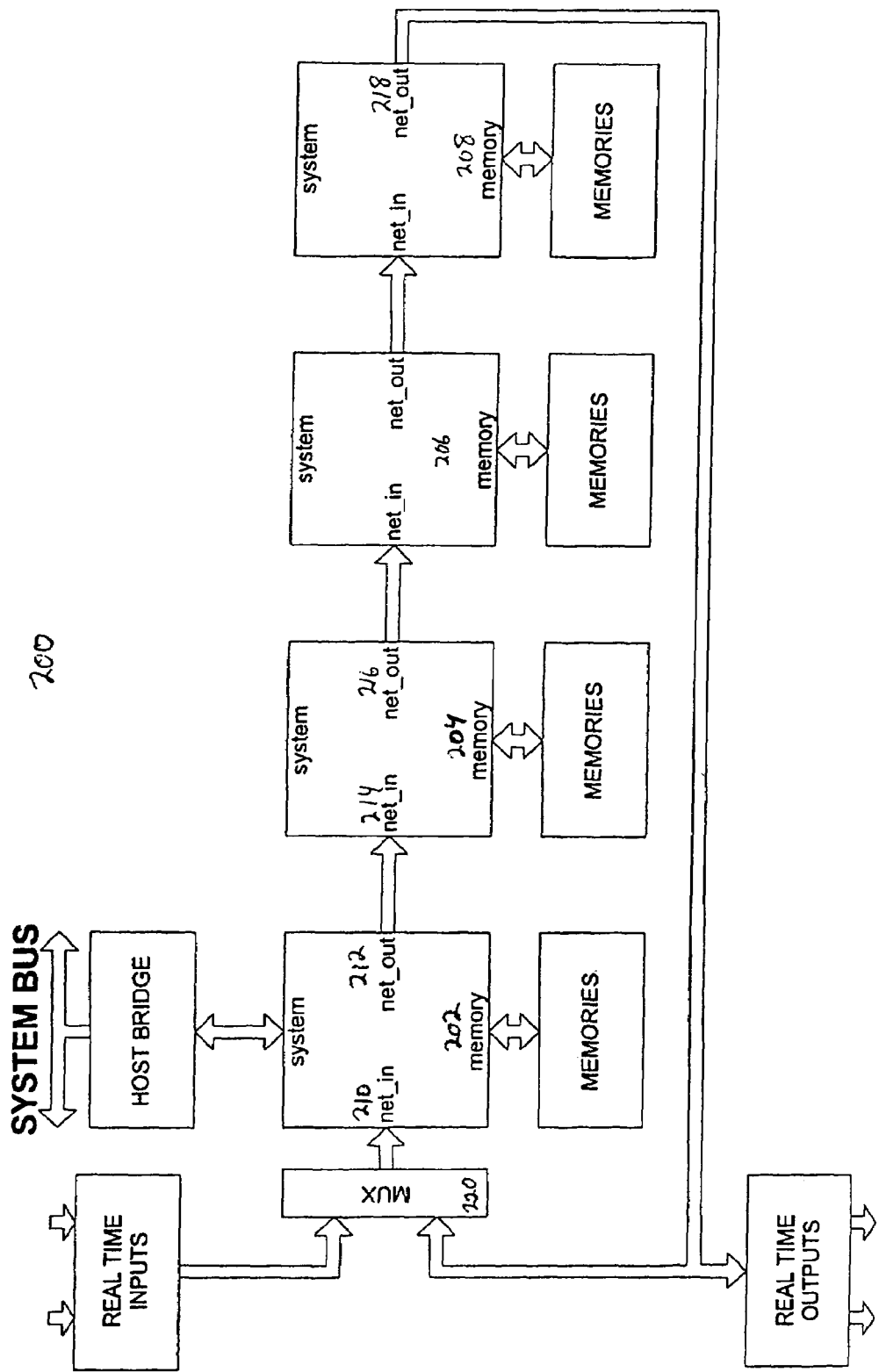
FIG. 2 illustrates a system of adaptive computing devices according to an embodiment of the invention.

The programmable interconnection network 110, in addition to facilitating communications between nodes within ACE device 100, also enables communication with nodes within other ACE devices. FIG. 2 shows a plurality of ACE devices 202, 204, 206, and 208, each having a plurality of nodes, connected together in a development system 200. The system bus interface of ACE device 202 communicates with external systems via an external system bus. Real-time input is communicated to and from ACE device 202 via a network input interface 210. Real-time inputs and additional data generated by ACE device 202 can be further communicated to ACE device 204 via network output interface 212 and network input interface 214. ACE device 204 communicates real-time inputs and additional data generated by either itself or ACE device 202 to ACE device 206 via network output interface 216. In this manner, any number of ACE devices may be coupled together to operate in parallel. Additionally, the network output interface 218 of the last ACE device in the series, ACE device 208, communicates real-time data output and optionally forms a data feedback loop with ACE device 202 via multiplexer 220.

As indicated above, there exists a need for a node in an adaptive computing engine (ACE) adapted to efficiently perform matrix operations for a wide variety of applications that offers fast performance, flexible configuration, low power consumption, and low cost. In accordance with the present invention, a reconfigurable execution node (RXN) fulfills these requirements and integrates seamlessly with other types of nodes in the ACE architecture. One aspect of the RXN is a distributed cache architecture that minimizes access to memory and general purpose registers, allows efficient access to matrix elements, and performs matrix transpose operations without the overhead of generating data addresses. Another aspect of the RXN is a control word compression scheme that reduces the power and overhead of instruction decoding, decreases the number of memory and cache accesses, and decreases the memory requirements for an application.

Figure 3:
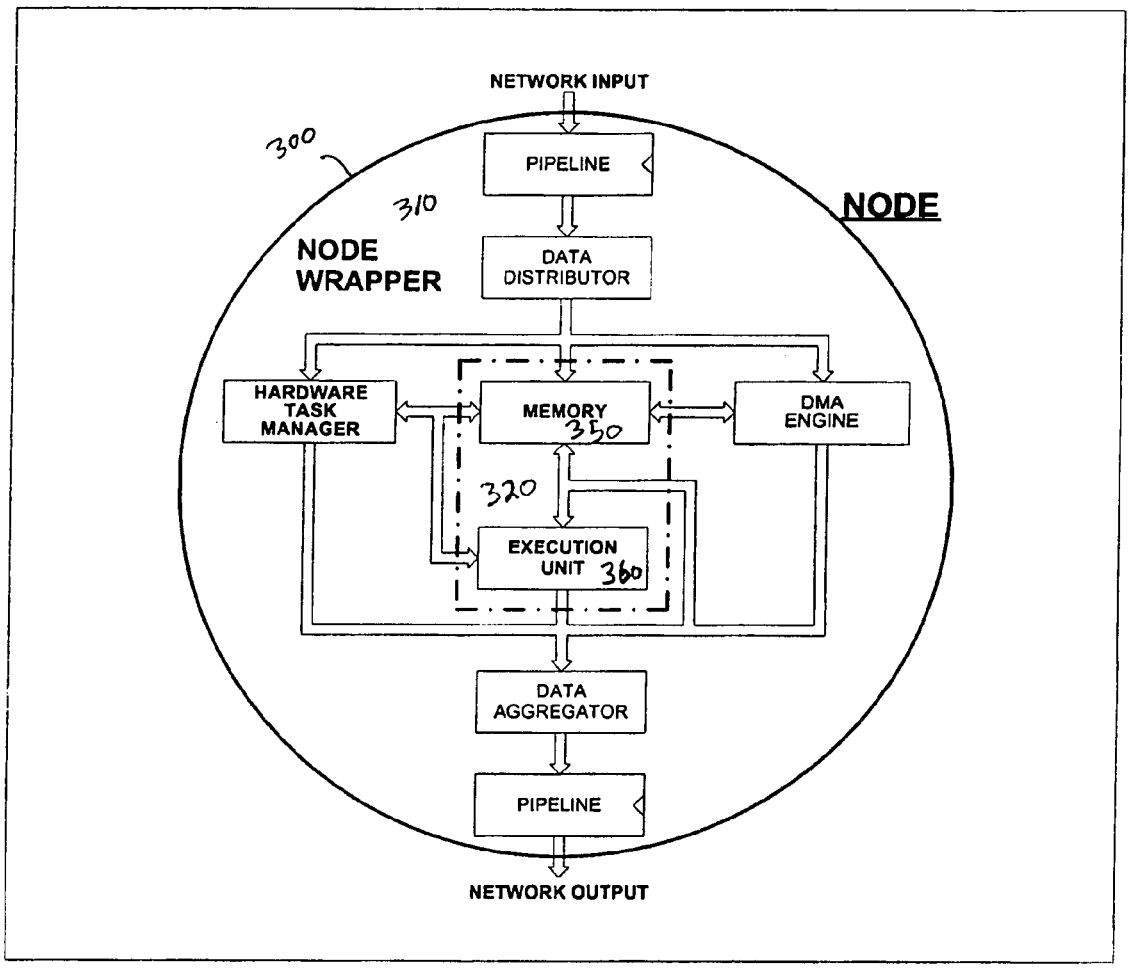
FIG. 3 illustrates a node of an adaptive computing device according to an embodiment of the invention.

FIG. 3 is a block diagram illustrating the general internal structure of a node for use in a ACE. Node 300 can be any type of node, including a node for internal memory, logic and bit-level functions, arithmetic functions, control functions, input and output functions, or an RXN according to the present invention. Node 300 includes a node wrapper 310 to facilitate communications with the programmable interconnection network. Node wrapper 310 receives data and configuration information from the programmable interconnection network and distributes information as appropriate to the node core 320. Node wrapper 310 also collects information from the node core 320 and sends it to other nodes or external devices via programmable interconnection network.

For receiving information, the node wrapper 310 includes a pipeline unit and a data distribution unit. For sending data, the node wrapper 310 includes a data aggregator unit and a pipeline unit. Node wrapper 310 also includes a hardware task manager 340 and a DMA engine 330 that coordinates direct memory access (DMA) operations.

The node core 320 is specific to the intended function of the node. Generally, the node core 320 includes node memory 350 and an execution unit 360. Node memory 350 serves as local storage for node configuration information and data processed by the node. Execution unit 360 processes data to perform the intended function of the node. The size and format of node memory 350 and the internal structure of the execution unit 360 are specific to the intended function of the node. For the RXN of the present invention, the execution unit 360 and the node memory 350 are designed as discussed below to efficiently perform a variety of matrix operations.

Figure 4:
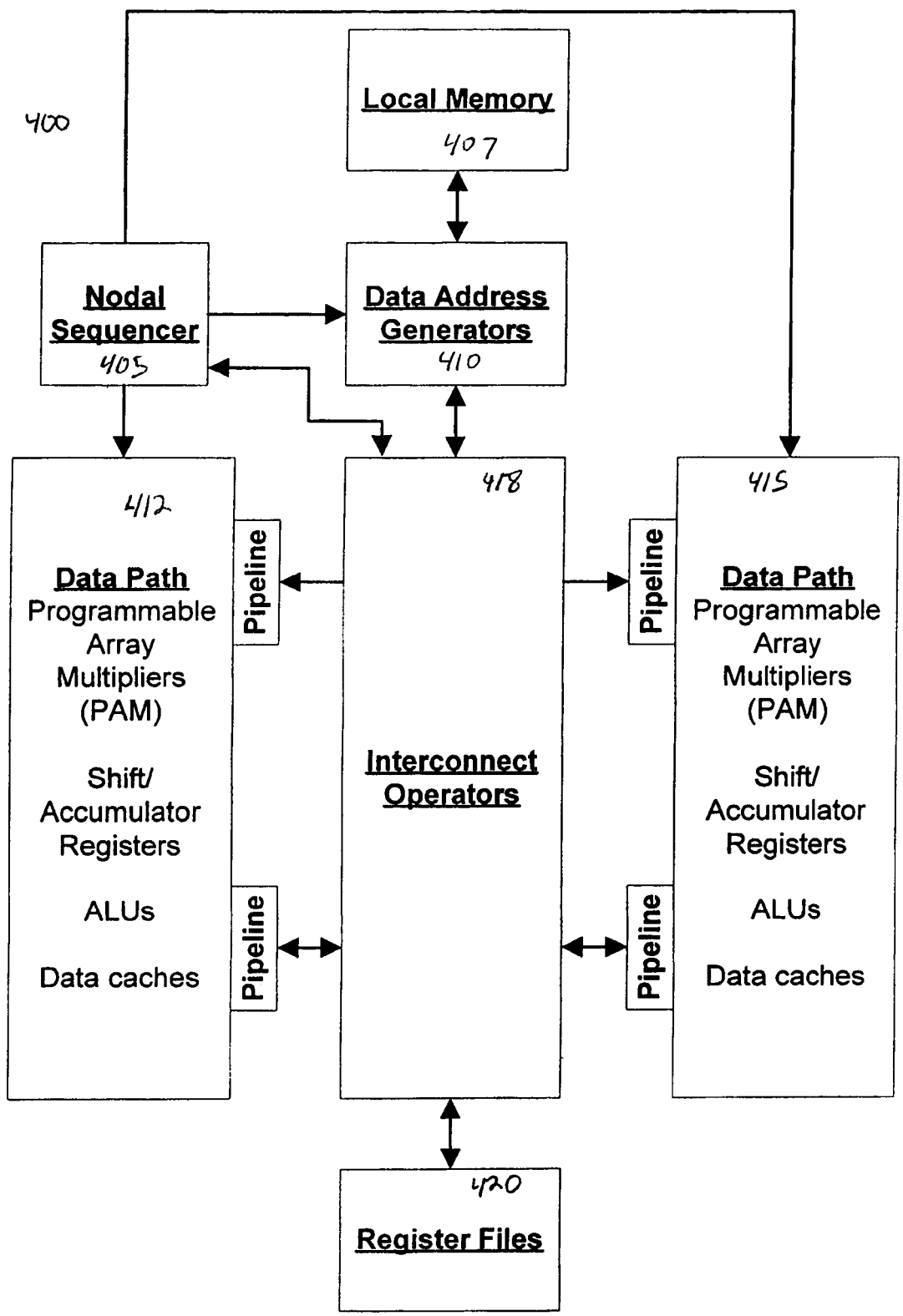
FIG. 4 illustrates the internal structure of a node according to an embodiment of the invention.

FIG. 4 is a block diagram illustrating the general structure of the node core 400 for an RXN node. A nodal sequencer 405 controls the operation of the node core 400, including configuring the various functional units of the node core 400, and implementing flow control operations such as conditional branching, looping, predicted execution, and procedure call. Connected with the nodal sequencer 405 is interconnect operators 418. Interconnect operators 418 allow each functional unit to get its input from the output of any other function unit, or from either registers or memory. The interconnect operators 418 support a high degree of instruction level parallelism and minimize the use of registers and memory to hold temporary values. In an embodiment, the interconnect operators 418 contain eight 16-bit buses.

Data address generators 410 (DAGs) interface local memory 407 with interconnect operators 418. DAGs 410 generate memory addresses corresponding to the memory locations of data to be stored or retrieved in local memory 407. DAGs 410 can be configured by nodal sequencer 405 to generate memory addresses in a sequence. In an embodiment, DAGs 410 include a base register specifying a base memory address, an index register specifying an offset from the base memory address, a delta register specifying an increment to be added to the index register to generate subsequent memory addresses, and a limit register specifying an upper limit to the sequence of memory addresses. In an embodiment, DAGs 410 include four independent data address generators interfaced to four blocks of 1024 by 32 bit byte-addressable memory.

Data Paths 412 and 415 are interfaced with interconnect operators 418. Each data path includes a plurality of programmable array multipliers (PAMs). In one embodiment, each PAM is an 8×8 multiply unit capable of signed or unsigned multiplication. The PAMs of each data path can be configured to operate independently to perform independent 8×8 multiplications, or combined to operate as one or more larger multiplier units. In an embodiment, each data path includes eight PAMs, for a total of sixteen PAMs. These can be combined as one 32×32, 24×24 or 32×24 multiplier, two 32×16, 32×8, 24×16, or 24×8 multipliers, or four 16×16 or 16×8 multipliers.

Each data path further includes a plurality of accumulators configured to accumulate outputs from one or more of the PAMs into a single register. When PAMs are combined to form larger multiplier units, two or more accumulators in the data path can be cascaded to form a single larger register as needed. Each accumulator also includes ZSR functions, which can perform byte level mask operations for data packing, saturate on overflow conditions, and rounding modes, including rounding to +/−infinity, zero, or nearest place. Additionally, each accumulator includes shift register functions, such as left or right shifts, fixed point conversion operations, and counting leading 1's or 0's. The accumulator outputs are interfaced with the interconnect operators 418. In an embodiment, each data path includes four 32-bit accumulators, each with an additional eight sign extension bits.

Each data path also includes a plurality of arithmetic logic units (ALUs) configured to perform arithmetic operations, such as addition, subtraction, averaging, incrementing, decrementing, Boolean logic operations, and other common ALU functions, such as absolute value, pass, minimum, maximum, compare, and clipping. The ALUs are configured to interface with the interconnect operators 418 for their input or output. In an embodiment, each data path includes two 16-bit ALU units with a cascaded carry bit connection, allowing the ALUs to act independently or as a larger ALU. Each data path additionally includes a data cache interfaced with the interconnect operators 418. The structure and operation of the data cache are discussed further below.

Register files 420 are connected with interconnect operators 418. Register files 420 include a plurality of general purpose registers to store intermediate data. In an embodiment, register files 420 include four 16-bit registers interfaced with each of the eight 16-bit buses of the interconnect operators 418.

Figure 5:
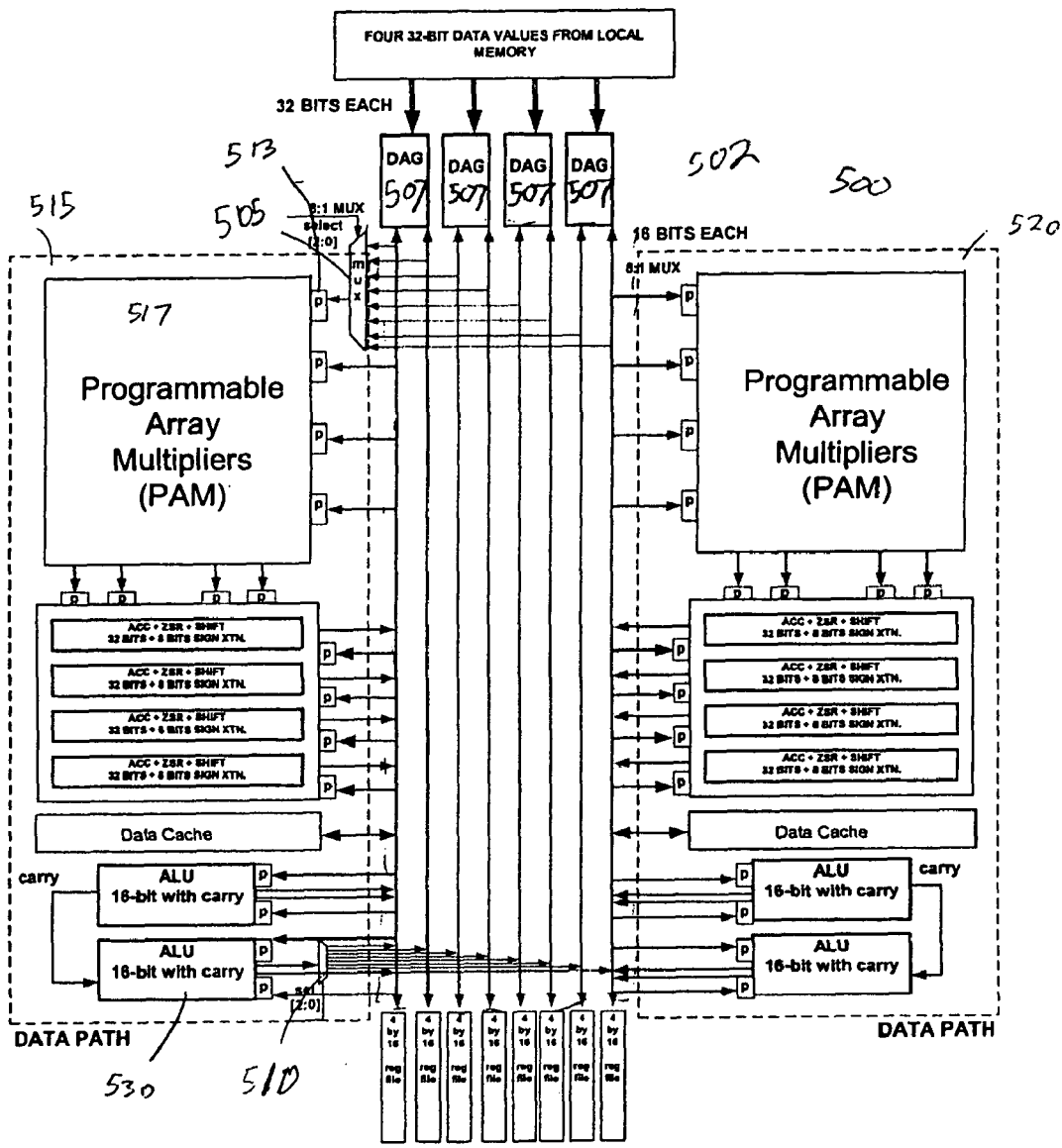
FIG. 5 illustrates a structure of a node core according to an embodiment of the invention.

FIG. 5 is a diagram illustrating the structure of the node core 500 for an RXN node in more detail. In this embodiment, the interconnect operator 502 includes eight 16-bit data buses. Pairs of data buses are connected to each one of the set of four data address generators 502. Multiplexer 505 connects a pipelined input register 513 of the programmable array multipliers 517 of data path 515 with each of the eight data buses of interconnect operator 502. The multiplexed input allows input data from any of the eight data buses to be transferred to the programmable array multipliers 517. Similarly, output multiplexer 510 connects the output of ALU 530 with each of the eight data buses, allowing output data to be transferred to any of the eight data buses. Although omitted from FIG. 5 for clarity, additional input and output multiplexers are used to connect the inputs and outputs of data paths 515 and 520 to each of the eight data buses, such that any input can receive data from any of the data buses and, similarly, any output can transfer data on to any of the data buses.

Figure 6:
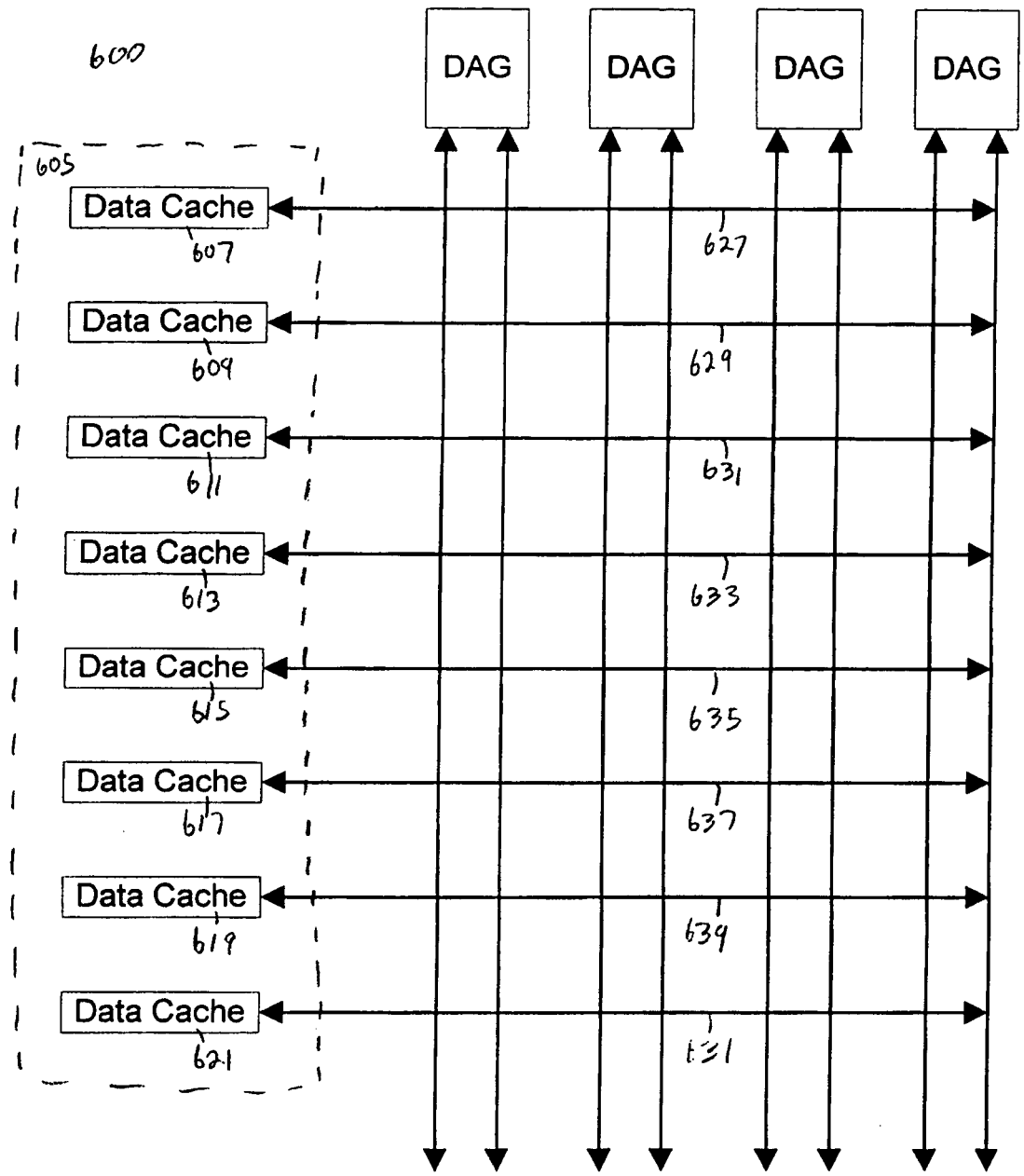
FIG. 6 illustrates a distributed data cache according to an embodiment of the invention.

FIG. 6 is a diagram 600 illustrating a distributed data cache associated with the data paths discussed above. Distributed data cache 605 includes a plurality of separate cache memories 607, 609, 611, 613, 615, 617, 619, and 621. The cache memories are connected with each of the data buses via separate data connections 627, 629, 631, 633, 635, 637, 639, and 641, respectively. The operation of each of these data lines is discussed below. In an embodiment, the number of cache memories is equal to the number of separate data buses. As discussed below, this allows matrix transpose operations to be performed efficiently.

Figure 7:
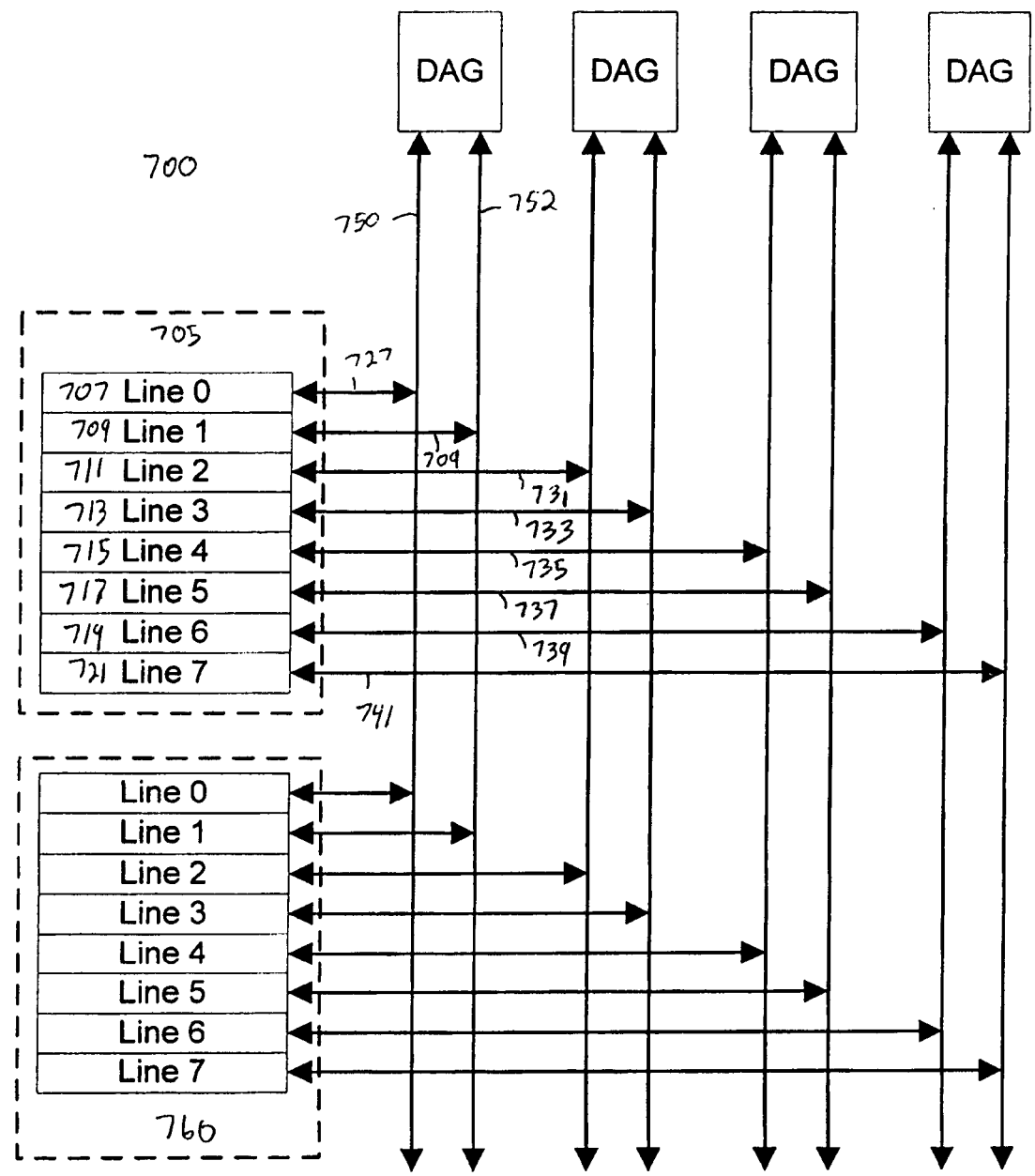
FIG. 7 illustrates the connection between an individual cache memory and the data buses according to an embodiment of the invention.

FIG. 7 is a diagram 700 illustrating the connection between an individual cache memory and the data buses. Cache memory 705 includes a plurality of cache lines 707, 709, 711, 713, 715, 717, 719, and 721. Cache lines are each connected to one of the data buses via data lines 727, 729, 731, 733, 735, 737, 739, and 741. For example, cache line 707 is connected with the data bus 750, and cache line 709 is connected with data bus 752. In an embodiment, each cache line is the same width as the data bus, for example 16 bits, and the number of cache lines in each cache memory is equal to the number of data buses. In this arrangement, each data bus is connected to a different cache line in the cache memories. Additional cache memories, for example cache memory 760, are connected to the data buses in an identical fashion. Thus, in an embodiment with eight data buses and eight cache memories, with each cache memory having eight cache lines, each data bus is connected to one cache line in each cache memory.

The distributed data cache can be accessed with either a single line mode or with a burst mode. In the single line mode, the data is read from or written to a single cache line. In this mode, data is transferred to and from the cache by the data bus connected with the cache line. In burst mode, all of the lines of a cache memory are written to or read from the cache at once. Since each cache line is connected with a different data bus, data can be transferred simultaneously to or from each cache line. Burst mode allows sets of data, for example a group of eight matrix coefficients, to be transferred efficiently to or from the data paths without the need for temporary registers or access to local memory. Additionally, since each data path input and output can be selectively connected with any of the data buses via a multiplexer, as discussed above in FIG. 5, there is never any need for data to be transferred from one data bus to another data bus.

The distributed data cache also enables matrix transpose operations to be performed easily and without additional overhead. 8×8 matrices are commonly used in many applications. For example, the JPEG image compression standard divides an image into blocks of 8×8 pixels. An embodiment of the distributed cache architecture having eight data buses and eight cache memories, each with eight cache lines, can efficiently transpose an 8×8 matrix. To transpose a matrix, a matrix row is read from local memory by the data address generators, and each element of the matrix row is transferred to a different data bus. Then, a burst mode operation is used to simultaneously transfer all of the row elements from their respective data buses into the corresponding cache lines of one of the cache memories. This process is repeated for the remaining rows of the matrix, with each row being stored in a different cache memory. Once this operation is completed, each cache memory contains a column of the transposed matrix.

Although this embodiment is configured to work with 8×8 matrices, smaller matrices can also be transposed with this embodiment. An alternate embodiment with additional data buses, cache memories, and cache lines can perform the same operation on matrices larger than 8×8.

The advantage of this operation is that the transposed matrix was created using sequential reads from the main memory and burst mode cache writes, and did not require any complicated data address generation, temporary data storage, or data reordering. Not only does the distributed data cache improve the speed of the transpose operation, but since up to 70% of the power consumption is used in accessing memory or general purpose data registers, the distributed data cache consumes much less power than prior designs. Additional power savings are realized because a set of small cache memories consume less power than a single, large cache memory of the same size.

As shown above, the RXN includes numerous selectively configurable elements, such as PAMs, accumulators, and ALU units. These configurable elements can be selectively connected together in a variety of different ways via multiplexers, data bases, data caches, and register files. The configuration of these programmable elements and the connections between them is determined by the value of a control word. A control word includes a number of control bits. In an embodiment, each bit of the control word is associated with the configuration of one of the configurable elements or a connections. In an alternate embodiment, additional bits can be used to control execution flow, such as branching or looping operations. Depending upon the complexity of the configuration, multiple bits may be used to fully configure a configurable element. In an embodiment, each control word is 256 bits.

The RXN executes many control words in sequence to perform the desired processing operations. In an embodiment, the nodal sequencer, shown in FIG. 4, retrieves control words from memory, interprets the control word, and distributes the control bits within each control word to the appropriate configurable elements or connections. Many typical applications repeatedly execute a small number of control words as part of an inner loop. In another aspect of the invention, the RXN includes a control word compression scheme for frequently used control words. The control word compression scheme reduces the power and overhead of control word decoding, decreases the number of memory and cache accesses, and decreases the memory requirements for an application.

FIG. 8A illustrates a control word cache 805 used for control word compression according to an embodiment of the invention. Control word cache 805 includes at least one control word cache line. In an embodiment, control word cache 805 includes eight control word cache lines, 807, 809, 811, 813, 815, 817, 819, and 821. Each control word cache line can store or retrieve a complete set of control bits upon demand. In an embodiment, the control word cache lines are associated with an index value. For example, control word cache line 807 has an index of 0, and control word cache line 813 has an index of 3. Each control word cache can be accessed by its associated index value. In an embodiment with eight control word cache lines, only three bits are needed to select one of the control word cache lines. The depth, or number of cache lines, of the control word cache can be optimized for a specific applications. For example, applications with large inner loops can use an RXN with a larger control word cache.

FIG. 8B illustrates the structure of a control word according to an embodiment of the invention. In this embodiment, the control word includes a flag portion 828 and a control portion 830. The flag portion 828 includes at least one bit to indicate to the nodal sequencer the type of control information in the control portion 830. The control portion 830 may include a set of control bits directly associated with configurable elements and connections of the RXN, as discussed above. Alternatively, the control portion 830 may include a set of references to control word cache line indices. The set of references to control word cache line indices specifies a set of instructions to be retrieved from the control word cache. The sequence of the references to control word cache lines indicates the sequence of execution for the control words retrieved from the control word cache.

FIG. 8C illustrates a compressed control word 835 containing a set of references to control word cache line indices 840 according to an embodiment of the invention. Control word 835 has a flag 838 indicating that the remaining control portion 840 of the control word is a set of references to the control word cache line indices. In this embodiment, control word 835 is 256 bits long. The flag 838 is a single bit, and the control portion 840 is the remaining 255 bits. In an embodiment where each control word cache line index is three bits, the 255 bit control portion 840 can specify a sequence of up to 85 control words. Thus, when frequently executed control words are stored in the control word cache, the control word compression scheme saves substantial amounts of application memory. Additionally, because of the relatively small size of the control word cache and the decreased number of local memory accesses when using the control word compression scheme, the power consumption of the RXN is substantially decreased.

Control words can be stored in the control word cache in a number of different ways. In an embodiment, a compiler used to create applications for the RXN identifies sequences of frequently used control words, which typically are located within execution loops. Alternatively, an application programmer can specify specific sequences of source code to be compressed. Once the control words to be compressed are identified, the compiler inserts additional instructions within the compiled application code specifying control words to be loaded into the control word cache. The positions of the inserted instructions within the application code determines when control words are loaded into the control word cache.

In one embodiment, control words can be loaded into the instruction as they are executed for the first time in a sequence. In this embodiment, the compiler inserts a flag into the control word indicating to the nodal sequencer that the control word should be stored in a specific control word cache line. In a further embodiment, a set of control words can be stored in the control word cache using a burst mode instruction. In this embodiment, the compiler inserts a burst mode instruction into the compiled application code. The burst mode instruction is followed by a set of control words to be stored in the control word cache.

In addition to specifying the instructions to be stored in the control word cache, the compiler formats control words to use the cached control words. In an embodiment, the compiler creates control words with a flag value indicating the use of control word cache line indices in the control portion of the control word. The compiler then inserts into the control portion the sequence of control word cache line indices that correspond to the sequence of control words to be executed.

In a further embodiment, the compiler assigns control words to specific control word cache lines so that the same index is used repeatedly. This allows for further compression of the application. For example, the compiler can store a first control word (CW1) in index 0 of the control word cache. Subsequent accesses to this control word can be referenced by the "0" index. A second instruction (CW2) can be stored in the control word cache in index 0, overwriting the first instruction. Subsequent accesses to the second control word can also be referenced by the "0" index. The execution sequence for this application can be seen as "CW1, 0, 0, 0, 0, . . . , CW2, 0, 0, 0, 0, . . . " This sequence of control words can easily be compressed, for example by zero-packing or run-length encoding.

Those skilled in the art will appreciate that the present invention establishes a distributed cache architecture and a control word compression scheme that offers fast performance, flexible configuration, low power consumption, and low cost. Either of these aspects of the present invention can be adapted to any information processing device. The embodiments described are intended in all respects to be illustrative rather than restrictive. Therefore, it should be understood that the method and apparatus of the present invention could be practiced with modification and alteration within the spirit and scope of the claims herein. Furthermore, the invention may be implemented in any combination of hardware and/or software. Alternative embodiments will become apparent to those skilled in the art to which the present invention pertains without departing from its spirit and scope.

What is claimed is:

1. A distributed data cache coupled to one of a plurality of reconfigurable execution nodes (RXN), wherein the reconfigurable execution nodes are coupled by a programmable interconnection network having a network root and a plurality of crosspoint switches, each of the RXNs being selectively configurable to perform a one of a plurality of processing operations, the distributed data cache comprising:
- a plurality of cache memory units each having a plurality of cache ports;
- a plurality of data buses connected with each of the cache memory units, wherein each of the plurality of data buses is connected with one of the plurality of cache ports of each of the cache memory units;
- the reconfigurable execution node adapted for actively processing data and having at least one data input and at least one data output, wherein the data input and data output are connected with the plurality of data buses; and
- wherein the RXN is adapted to be reconfigured to perform a sequence of operations to actively process data responsive to a sequence of the control words stored in the cache memory.

2. The distributed data cache of claim 1, further comprising a multiplexer for alternately connecting the data input with each of the plurality of data buses.

3. The distributed data cache of claim 1, further comprising a multiplexer for alternately connecting the data ouput with each of the plurality of data buses.

4. The distributed data cache of claim 1, further comprising a plurality of data address generators connected with a memory unit and the plurality of data buses.

5. The distributed data cache of claim 4, wherein the plurality of data address generators are adapted to retrieve a plurality of data values from the memory unit and communicate the plurality of data values to the plurality of data buses.

6. The distributed data cache of claim 5, wherein the plurality of data address generators are adapted to simultaneously communicate the plurality of data values to the plurality of data buses, wherein each of the plurality of data value is communicated to a different one of the plurality of data buses.

7. The distributed data cache of claim 6, wherein the first cache memory unit is adapted to simultaneously load a plurality of data values from the plurality of data buses, such that each of the plurality of data values is loaded in a different one of the plurality of cache lines of the first cache memory unit through the same port.

8. The distributed data cache of claim 1, wherein the number of cache lines of the first cache memory unit are equal to the number of data buses.

9. The distributed data cache of claim 1, further comprising at least one additional cache memory unit also having a plurality of cache lines, wherein each cache line of the additional cache memory unit is connected with the plurality of data buses.

10. The distributed data cache of claim 9, wherein the total number of cache memory units is equal to the number of cache lines in each cache memory unit.

11. The distributed data cache of claim 1, wherein the RXN includes a plurality of selectively configurable elements each having a configuration determined by the value of a multi-bit control word, the bits being simultaneously supplied in one or more of the control words stored in the cache memory units over the data buses.

12. The distributed data cache of claim 11, wherein each of the memory units comprises a plurality of cache lines, each cache line being associated with one of the plurality of cache ports, each cache line storing one of the control words, the sequence of control words being retrieved by an index uniquely identifying the cache line, a sequence of the indexes defining a single access control word.

13. The distributed data cache of claim 12, wherein the access control world is identified by a flag bit, the remainder of the access control word comprising a sequence of indexes.

14. An apparatus for transferring a plurality of data values arranged in a matrix, the apparatus coupled to one of a plurality of heterogeneous processing nodes, wherein the heterogeneous processing nodes are coupled by a programmable interconnection network having a network root and a plurality of crosspoint switches, the apparatus comprising:
- a plurality of cache memory units, each cache memory unit having a plurality of cache ports; and
- a plurality of data buses, each data bus connected with a different one of the plurality of cache ports from each of the cache memory or register file units so that each of the data buses is connected to one port of every one of the data buses.

15. The apparatus of claim 14, further comprising a plurality of data address generators adapted to retrieve a plurality of sets data values from the memory unit and communicate the plurality of sets data values to the plurality of data buses, the apparatus being configured to transpose a matrix stored in the main memory by reading a matrix comprising a plurality of row elements from the main memory into the plurality of data buses, then simultaneously transferring the row elements to the cache ports of each one of the cache memories, and repeating the operation for each row of the stored matrix.

16. The apparatus of claim 14, wherein the plurality of data address generators are adapted to sequentially communicate the plurality of sets of data values with the plurality of data buses; and
- wherein each and every of the cache memory units is adapted to simultaneously load one of the sets of data values from the plurality of data buses, such that each data value of the set of data values is simultaneously loaded in a different one of the plurality of cache orts of the cache memory unit or register file.

17. A method for transferring a plurality of data values arranged in a matrix to transpose the matrix, the matrix including a plurality of heterogeneous processing nodes coupled by a programmable interconnection network having a network root and a plurality of crosspoint switches, the method comprising:
- retrieving a first subset of data values from the plurality of data values from a memory unit storing the matrix in rows;
- simultaneously transferring the first subset of data values comprising one of the rows of the matrix; to a plurality of data buses, wherein each data value of the first subset is transferred to a different one of the plurality of data buses;
- simultaneously loading the first subset of data values from the plurality of data buses to a first cache memory unit having a plurality of cache ports, wherein each cache port receives a data value from a different one of the plurality of data buses to define a column of the matrix; and
- repeating the operation for each row of the matrix to complete transposing of the matrix.

* * * * *

UNITED STATES PATENT AND TRADEMARK OFFICE
CERTIFICATE OF CORRECTION

PATENT NO. : 7,340,562 B2
APPLICATION NO. : 10/628036
DATED : March 4, 2008
INVENTOR(S) : Amit Ramchandran Page 1 of 1

It is certified that error appears in the above-identified patent and that said Letters Patent is hereby corrected as shown below:

In column 12, line 5, please replace "world" with --word--

In column 12, line 40, please replace "orts" with --ports--

Signed and Sealed this

Fifth Day of August, 2008

JON W. DUDAS
*Director of the United States Patent and Trademark Office*